United States Patent
Duraisamy et al.

(10) Patent No.: US 11,316,796 B2
(45) Date of Patent: Apr. 26, 2022

(54) SPRAYING FOR UNEQUAL LINK CONNECTIONS IN AN INTERNAL SWITCH FABRIC

(71) Applicant: Juniper Networks, Inc., Sunnyvale, CA (US)

(72) Inventors: Senthil Duraisamy, Bengaluru (IN); Harshad B Agashe, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 43 days.

(21) Appl. No.: 16/730,031

(22) Filed: Dec. 30, 2019

(65) Prior Publication Data

US 2021/0203612 A1    Jul. 1, 2021

(51) Int. Cl.
| | |
|---|---|
| *H04L 12/863* | (2013.01) |
| *H04L 47/62* | (2022.01) |
| *H04L 49/101* | (2022.01) |
| *H04L 49/1515* | (2022.01) |
| *H04L 49/00* | (2022.01) |

(52) U.S. Cl.
CPC ......... *H04L 47/622* (2013.01); *H04L 49/101* (2013.01); *H04L 49/1523* (2013.01); *H04L 49/3009* (2013.01)

(58) Field of Classification Search
CPC ......... H04L 47/12; H04L 49/25; H04L 49/50; H04L 47/50; H04L 49/90; H04L 2012/5681
USPC ........................................................ 370/412
See application file for complete search history.

(56) References Cited

U.S. PATENT DOCUMENTS

| | | | |
|---|---|---|---|
| 6,411,599 B1 | 6/2002 | Blanc et al. | |
| 7,102,999 B1 * | 9/2006 | Sindhu | H04L 49/3072 370/235 |
| 2006/0253606 A1 | 11/2006 | Okuno | |
| 2008/0044181 A1 | 2/2008 | Sindhu | |

(Continued)

FOREIGN PATENT DOCUMENTS

| | | |
|---|---|---|
| EP | 3057334 A1 | 8/2016 |
| JP | 2006313949 A | 11/2006 |

(Continued)

OTHER PUBLICATIONS

Extended Search Report from counterpart European Application No. 20164969.6, dated Jul. 16, 2020, 7 pp.
Notice of Preliminary Rejection, and translation thereof, from counterpart Korean Application No. 10-2020-0034892, dated Jan. 19, 2021, 16 pp.

(Continued)

*Primary Examiner* — Robert J Lopata
(74) *Attorney, Agent, or Firm* — Shumaker & Sieffert, P.A.

(57) ABSTRACT

In general, techniques are described for facilitating balanced cell handling by fabric cores of a fabric plane for an internal device switch fabric. In some examples, a routing system includes a plurality of fabric endpoints and a switching fabric comprising a fabric plane to switch cells among the fabric endpoints. The fabric plane includes two fabric cores and one or more inter-core links connecting the fabric cores. Each fabric core selects an output port of the fabric core to which to route a received cell of the cells based on (i) an input port of the fabric core on which the received cell was received and (ii) a destination fabric endpoint for the received cell, at least a portion of the selected output ports being connected to the inter-core links, and switches the received cell to the selected output port.

20 Claims, 11 Drawing Sheets

(56) References Cited

U.S. PATENT DOCUMENTS

| | | | |
|---|---|---|---|
| 2009/0080428 A1* | 3/2009 | Witkowski | H04L 49/357 370/392 |
| 2010/0061242 A1* | 3/2010 | Sindhu | H04L 49/35 370/235 |
| 2010/0061389 A1* | 3/2010 | Sindhu | H04L 49/251 370/412 |
| 2012/0287939 A1 | 11/2012 | Leu et al. | |
| 2013/0028072 A1* | 1/2013 | Addanki | H04L 41/0659 370/218 |
| 2013/0205053 A1 | 8/2013 | Harriman et al. | |
| 2014/0016486 A1* | 1/2014 | Schzukin | H04L 49/10 370/252 |
| 2016/0007102 A1 | 1/2016 | Raza et al. | |
| 2016/0241430 A1* | 8/2016 | Yadav | H04L 43/0811 |
| 2019/0104206 A1 | 4/2019 | Goel et al. | |
| 2020/0213232 A1* | 7/2020 | Srivastava | H04L 47/12 |

FOREIGN PATENT DOCUMENTS

| | | |
|---|---|---|
| KR | 20130091690 A | 8/2013 |
| KR | 20130143123 A | 12/2013 |
| KR | 20160006766 A | 1/2016 |
| WO | 2014183126 A1 | 11/2014 |

OTHER PUBLICATIONS

Office Action, and Translation thereof, dated Jun. 30, 2021 received in TW Counterpart Application No. 109107780, 9 pp.

Office Action, and Translation thereof, dated Aug. 12, 2021 received in KR Counterpart Application No. 10-2020-0034892, 5 pp.

Response to Extended Search Report dated Jul. 12, 2021, from counterpart European Application No. 20164969.6 filed Jan. 6, 2022, 19 pp.

* cited by examiner

SPRAYING FOR UNEQUAL LINK CONNECTIONS IN AN INTERNAL SWITCH FABRIC

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers and are designed to handle high volumes of network traffic.

Routers may include line cards that include network interfaces cards having ports as well as packet forwarding engines (PFEs) or other packet processors. The line cards receive and process packets from the network to be switched through the router switch fabric and receive packets from the switch fabric to be sent to the next destination in the network. The switch fabric of a router may include fabric cards with fabric planes that switch traffic through the router from an ingress port on one line card to a destination egress port on another line card.

SUMMARY

In general, techniques are described for facilitating balanced cell handling by fabric cores of a fabric plane for an internal device switch fabric. The techniques may include spraying cells among inter-core links connecting the fabric cores to each other and among direct links to destination fabric endpoints that connect to the fabric cores. The techniques may be particularly applicable when the fabric endpoints share an odd number of available links to a fabric plane or when multiple fabric endpoints have different numbers of links to the fabric plane, resulting in unbalanced connectivity with the fabric plane.

For example, two fabric endpoints on a line card may collectively have an odd number of links to a fabric plane. One of these links is shared among the two fabric endpoints. The fabric plane includes two fabric cores, and the odd number of links are apportioned equally among and connected to the two cores, with the exception of the shared link, which is connected to only a first core of the cores. In another example, two fabric endpoints may have a different number of links to a fabric plane. For instance, a first fabric endpoint may have 4 links to each of the two cores, while a second fabric endpoints may have a single link to each of the two cores. Such fabric endpoints, and their respective connecting sets of links, are unbalanced.

To facilitate balanced cell handling between the two fabric cores for these two scenarios of shared or unbalanced links, the first core sprays a portion of the cell traffic that is received on a shared or unbalanced link to the second core of the cores via an inter-core link. As used herein, an interconnection port is a port on a fabric core that is communicatively coupled via an inter-core link to another fabric core, an output port is a port of a fabric core connected to a fabric endpoint or other fabric core to send cells, and an input port is a port of a fabric core to receive cells from a fabric endpoint or other fabric core. When a cell arrives at an input port of the fabric plane, the initial receiving fabric core for the cell may determine, based at least on the input port that indicates whether the link between the source fabric endpoint and the input port is unbalanced or shared, whether to send the cell via an inter-core link to the other fabric core for switching to the output port.

The techniques may provide one or more technical advantages to facilitate at least one practical application. For example, the cell handling techniques may enable multicore fabric plane switching architectures, the fabric planes having odd numbers of links shared among multiple fabric endpoints, to achieve balanced (i.e., fair) cell handling among the fabric cores. As another example, the cell handling techniques may enable unbalanced link connectivity among fabric endpoints with a multicore fabric plane to achieve balanced cell handling among the fabric cores.

In one example, a routing system includes a plurality of fabric endpoints and a switching fabric comprising a fabric plane to switch cells among the fabric endpoints. The fabric plane includes two fabric cores and one or more inter-core links connecting the fabric cores. Each fabric core selects an output port of the fabric core to which to route a received cell of the cells based on (i) an input port of the fabric core on which the received cell was received and (ii) a destination fabric endpoint for the received cell, at least a portion of the selected output ports being connected to the inter-core links, and switches the received cell to the selected output port.

In another example includes a method of routings cell in a router with a plurality of endpoints and a switching fabric comprising a fabric plane to switch cells among the endpoints. The switch fabric plane includes two of fabric cores and one or more inter-core links connecting the fabric cores. The method includes receiving cells at a plurality of input ports. The method also includes selecting, by the fabric cores, an output port of the fabric core to route a received cell of the cells based on (i) an input port of the fabric core on which the received cell was received and (ii) a destination fabric endpoint for the received cell, at least a portion of the selected output ports being connected to the inter-core links. Additionally, the method includes switching the received cell to the selected output ports.

In another example, a network device includes a plurality of line cards collectively having a plurality of fabric endpoints, and a fabric switch card coupled to the line cards and comprising a fabric plane to switch cells among the fabric endpoints. The fabric plane includes two fabric cores and one or more inter-core links connecting the fabric cores. Each fabric core selects an output port of the fabric core to route a received cell of the cells based on (i) an input port of the fabric core on which the received cell was received and (ii) a destination fabric endpoint for the received cell, at least a portion of the selected output ports being connected to the inter-core links, and switches the received cell to the selected output port.

The details of one or more examples are set forth in the accompanying drawings and the description below. Other features, objects, and advantages will be apparent from the description and drawings, and from the claims.

DETAILED DESCRIPTION

Figure 1:
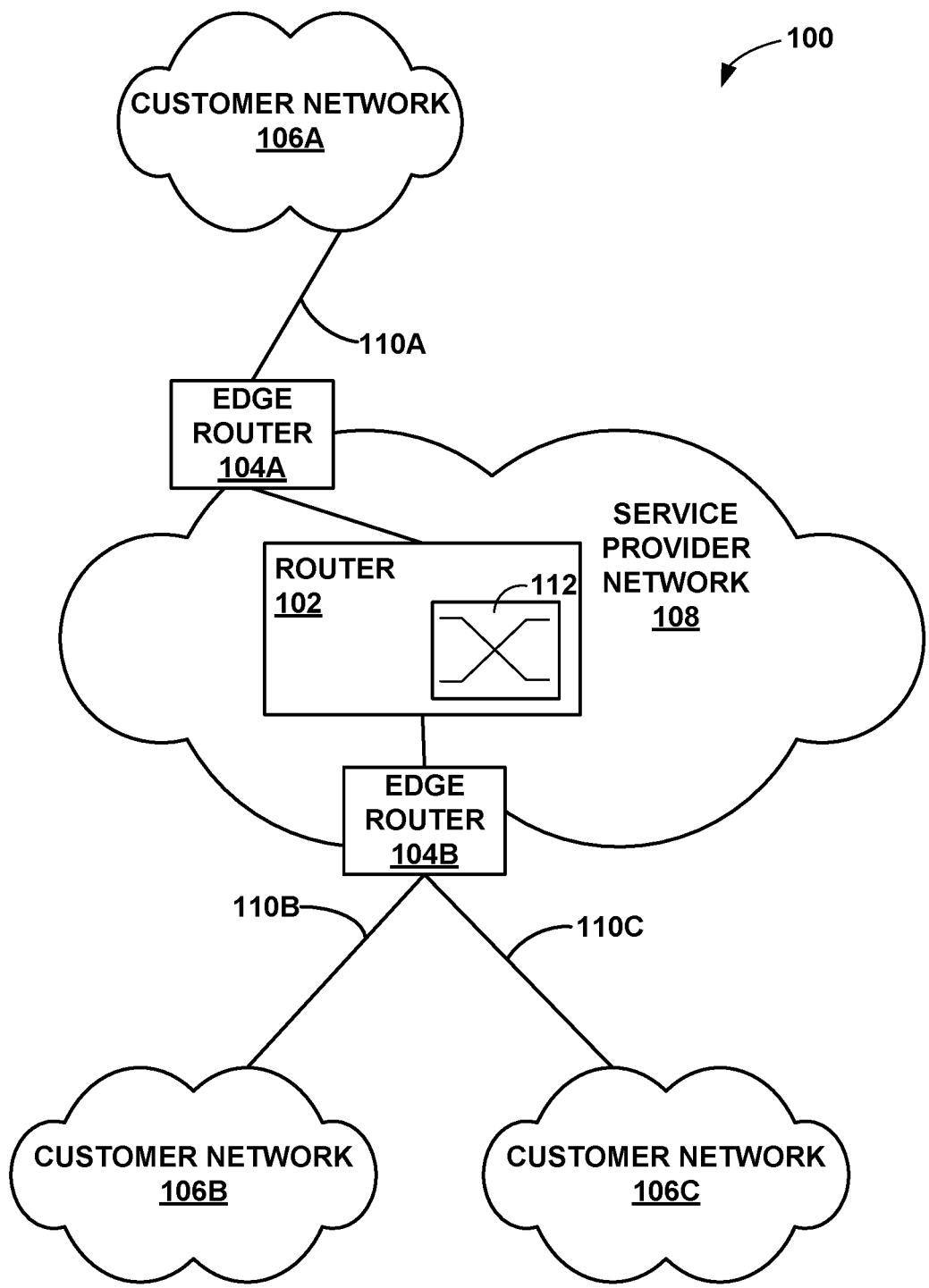
FIG. 1 is a block diagram illustrating an example network environment in which service provider network includes an unequal link capable router configured in accordance with techniques described in this disclosure.

FIG. 1 is a block diagram illustrating an example network environment in which service provider network includes a router configured in accordance with techniques described in this disclosure. For purposes of example, the principles of the invention are described with respect to a simplified network environment 100 of FIG. 1 in which a router 102 communicates with edge routers 104A and 104B (collectively "edge routers 104") to provide customer networks 106A-106C (collectively "customer networks 106") with access to service provider network 108. The router 102 may exchange routing information with the edge routers 104 in order to maintain an accurate representation of the topology of the network environment 100. As described below, the router 102 may consist of a plurality of cooperative routing components operating as a single node within the service provider network 108. The router 102 includes a chassis (not shown in FIG. 1) that couples various internal routing components (e.g., line cards, switching fabric cards, a routing engine card, etc.) together.

Although not illustrated, the service provider network 108 may be coupled to one or more networks administered by other providers, and may thus form part of a large-scale public network infrastructure, e.g., the Internet. Consequently, the customer networks 106 may be viewed as edge networks of the Internet. The service provider network 108 may provide computing devices within the customer networks 106 with access to the Internet, and may allow the computing devices within the customer networks 106 to communicate with each other. In another example, the service provider network 108 may provide network services within the core of the Internet. In either case, the service provider network 108 may include a variety of network devices (not shown) other than the router 102 and the edge routers 104, such as additional routers, switches, servers, or other devices.

In the illustrated example, the edge router 104A is coupled to the customer network 106A via access link 110A, and the edge router 104B is coupled to the customer networks 106B and 106C via additional access links 110B and 110C. The customer networks 106 may be networks for geographically separated sites of an enterprise. The customer networks 106 may include one or more computing devices (not shown), such as personal computers, laptop computers, handheld computers, workstations, servers, switches, printers, customer data centers or other devices. The configuration of the network environment 100 illustrated in FIG. 1 is merely an example. The service provider network 108 may be coupled to any number of the customer networks 106. Nonetheless, for ease of description, only an example number of customer networks 106A-106C are illustrated in FIG. 1. Many different types of networks besides service provider networks 108 may employ an instance of the router 102, including customer/enterprise networks, transport networks, aggregation or access networks, and so forth.

As described in further detail below, the router 102 includes a switch fabric 112. The switch fabric 112 includes switch fabric cards that provide fabric planes used to route cells through the router 102 between fabric endpoints connected to the fabric planes. The fabric planes include fabric cores with inter-core links that facilitate routing cells between fabric cores to balance cell traffic. This facilitates using fabric endpoints in a configuration in which each fabric endpoint need not have the same number of links to the fabric core, or in which multiple fabric endpoints can share an odd number of links, while maintaining a balanced traffic load for each fabric core. While this operation is transparent outside of the router 102, it provides a benefit of allowing a more flexible configuration of the line cards and fabric endpoints thereon such that the router 102 may be updated without updating the chassis or the switch fabric cards. As a consequence, the hardware configuration of the router 102 may be more flexible versus existing architectures.

Architectures in which each fabric plane has an equal number of links from each fabric endpoint to the fabric plane facilitate equal cell traffic being sprayed among the links between fabric endpoints. The switch fabric 112 includes one or more fabric planes. At least one of the fabric planes has multiple (e.g., two) fabric cores, each of the fabric cores being a separate cross-bar switch and connected to input ports and output ports of the fabric plane. In accordance with techniques of this disclosure, the fabric plane facilitates balanced cell handling by the fabric cores. The fabric cores are connected by one or more inter-core links. The techniques may include spraying cells among the inter-core links and among direct links to destination fabric endpoints that connect to the fabric cores via ports of the fabric plane. The techniques may be particularly applicable when the fabric endpoints share an odd number of available links to a fabric plane or when multiple fabric endpoints have different numbers of links to the fabric plane, resulting in unbalanced connectivity with the fabric plane.

The cell handling techniques may enable multicore fabric plane switching architectures, the fabric planes having odd numbers of links shared among multiple fabric endpoints, to achieve balanced (i.e., fair) cell handling among the fabric cores. As another example, the cell handling techniques may enable unbalanced link connectivity among fabric endpoints with a multicore fabric plane to achieve balanced cell handling among the fabric cores.

Figure 2:
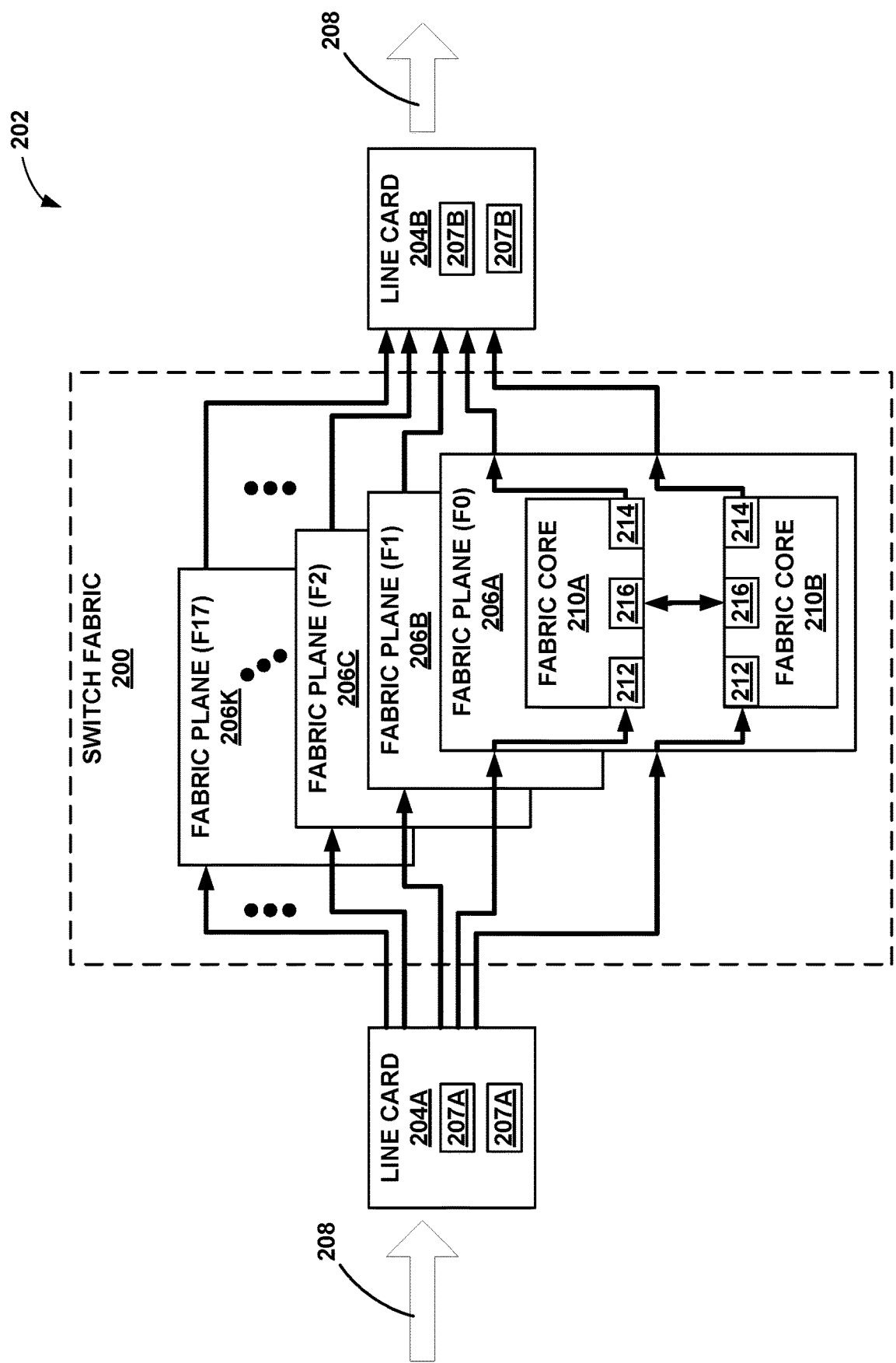
FIG. 2 is a block diagram illustrating an example of a switching system according to techniques described herein.

FIG. 2 is a block diagram illustrating an example of a switching system according to techniques described herein. Switch fabric 200 (sometime referred to as "fabric 200") of switching system 202 may represent an example instance of the switch fabric 112 of the router 102 of FIG. 1. Line cards 204A and 204B (collectively, "line cards 204") of the switching system 202 are separately coupled to each of fabric planes 206A-206K of the switch fabric 200 to operate as sources and/or destinations of data units (e.g., cells) switched by the fabric 200. Specifically, in the illustrated example, the line cards 204 have multiple fabric endpoint 207A and 207B (collectively, "fabric endpoints 207") that are connected to the fabric planes 206, via shared and unshared links, and operates as the sources and/or the destinations of the cells. In the illustrated example, the endpoints 207 one of the line cards 204A ingresses, originates, or otherwise sources packets 208 for switching via the switch fabric 200 to the endpoints 207 of another line card 204B that egresses, consumes, or otherwise sinks the packets 208.

Although each of the fabric endpoints 207 typically operates as both a source and a destination for cells, any of the fabric endpoints 207 may be either a source or a destination for cells in various instances. In some examples, the fabric endpoints 207 may each represent a packet forwarding engine (PFE) or other forwarding unit such that the fabric endpoints 207 collectively implement a distributed forwarding plane for a packet switching device (e.g. the router 102). In some examples, the fabric endpoints 207 may represent fabric interfaces for servers or other hosts (e.g., virtual machines) that exchange packets for a distributed application via the fabric 200. The fabric endpoints 207 may include respective switch fabric interfaces or "switch interfaces" (SIs—not shown) to provide queuing for cells being switched via the fabric 200, among other operations.

In this example, the switch fabric 200 includes a plurality of fabric planes 206A-206K (collectively referred to as "fabric planes 206") each include multiple fabric cores 210A and 210B. The fabric planes 206A-206K are operationally independent, parallel switch fabric planes supported by the fabric cores (illustrated as "fabric cores 210A and 210B" and referred to herein collectively as "fabric cores 210"). The switching system 202 may include one or more fabric planes 206. The switching system 202 may include one or more switch fabric cards to implement fabric planes 206. The number of fabric cores 210 in a single fabric plane 206 may be any number, dependent upon the respective capacities of the fabric cores 210 and the fabric bandwidth needed. In the illustrated example, fabric plane 206A includes two fabric cores 210A and 210B. Each fabric core 210 includes similar components for implementing an independent switch network (e.g., Benes network) to provide switching bandwidth to the fabric endpoints 207, the components and functionality being described hereinafter primarily with respect to the fabric cores 210A and 210B of fabric plane 206A. The fabric cores 210 of separate fabric planes 206 are operationally independent in that a failure of one of the fabric cores 210 of one fabric plane 206 does not affect the switching ability of the remaining, operational fabric planes of the other fabric planes 206. Each of the fabric cores 210 may provide non-blocking connectivity.

Each of the fabric cores 210 includes input ports 212 coupled to fabric endpoints 207A of the one of the line cards 204A and output ports 214 coupled to the fabric endpoints 207B of another one of the line cards 204B. Although only one line card 204A with two ingress fabric endpoints 207A and one line card 204B with two egress fabric endpoints 207B are illustrated for simplicity, each fabric plane 206 typically includes multiple input ports 212 and output ports 214 coupled to respective fabric endpoints of multiple line cards. When a fabric endpoint 207A obtains a packet, the fabric endpoint 207A performs a lookup operation to determine which fabric endpoint (one of the fabric endpoints 207B of the line card 204B in this example) is a destination for the packet. Obtaining a packet may refer to receiving a packet from the network or host, or originating a packet, for example. The fabric endpoint 207A optionally divides the packet into cells and forwards the packet/cells across the fabric 200 to a destination fabric endpoint 207B. The fabric endpoint 207A selects different fabric planes 206 to switch the cells to distribute the bandwidth load across the fabric planes 206.

The fabric endpoints 207 may employ a request/grant protocol to transmit a data cell across the fabric 200. In such cases, the source fabric endpoint 207 transmits a request across the fabric 200 to the destination fabric endpoint 207. In some examples, to send cells across a selected fabric plane 206A for the cells, the source fabric endpoint 207A transmits each such request across a different one of the fabric cores 210 in a round-robin (e.g., deficit weighted round robin, etc.) or other balancing order to fairly distribute the transport load. In response to receiving the request, the destination fabric endpoint 207 transmits a grant to the source fabric endpoint 207A across the same fabric core 210 on which destination fabric endpoint 207B received the corresponding request. In response to receiving the grant, the source fabric endpoint 207A transmits the data cell to the destination fabric endpoint 207B across the same fabric core 210 on which the source fabric endpoint 207A issued the corresponding request.

In the illustrated example, the fabric cores 210 on the same fabric plane 206 includes inter-core ports 216 that facilitate cells being transferred between the two fabric cores 210 to distribute traffic going toward the fabric endpoints 207 evenly. Unbalanced connections occur when the fabric endpoints 207 have a different number of connections to the fabric cores 210. When a cell is sent from the source fabric endpoint 207A to the fabric core 210 with which it has an unbalanced connection, the cell may be forwarded to the other fabric core 210 via the inter-core link to be routed. In such a manner, the switch fabric 200 accommodates a configuration wherein the number of links from the fabric endpoints 207 means that the fabric endpoints cannot have equal connections to the fabric core 210.

Unbalanced connections may occur because fabric endpoints with different configurations, such as a different number of links per fabric plane, are used within a router and/or a set of two or more fabric endpoints may have an odd number of links with one or more of the fabric planes 206 such that the two or more fabric endpoints may share a link to utilize the collective bandwidth of the links effectively.

Figure 3A:
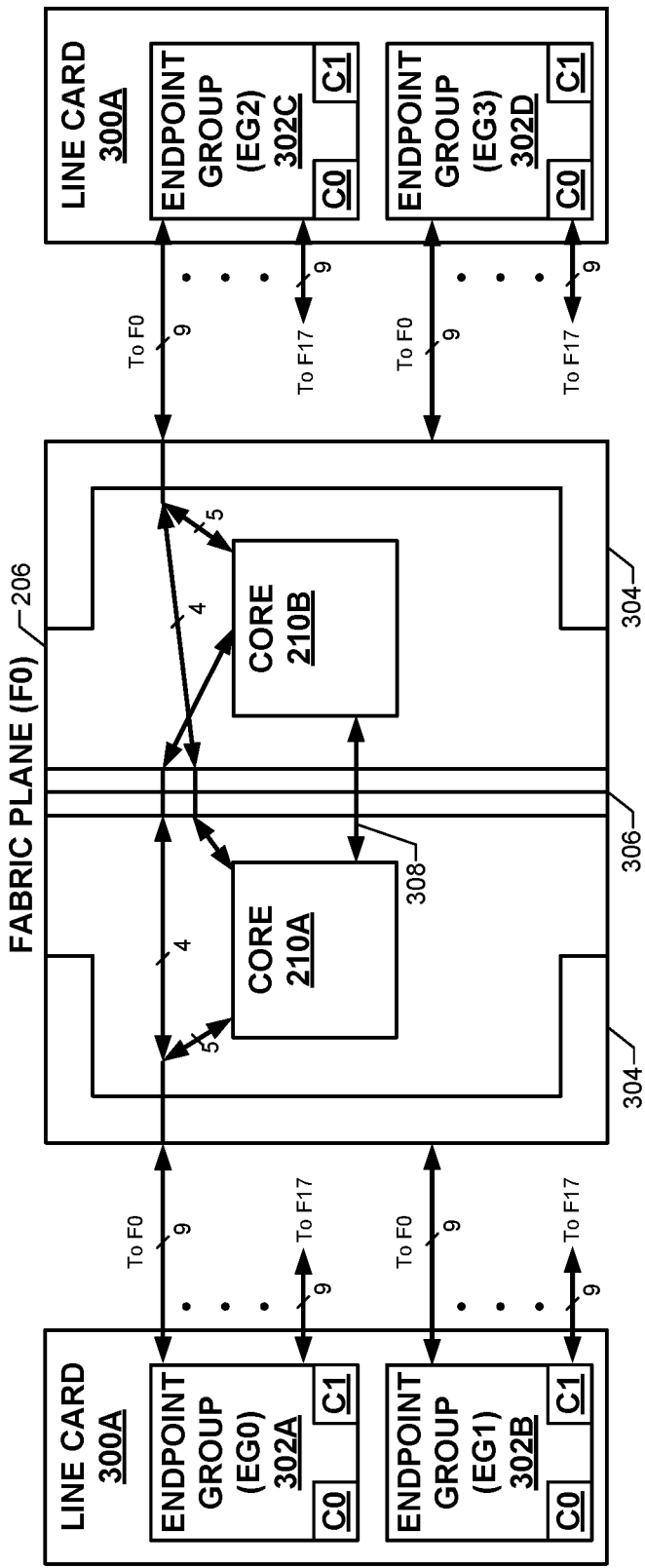
FIGS. 3A and 3B are block diagrams of line cards having fabric endpoints with shared and/or unbalanced link connections to a fabric plane.
Figure 3B:
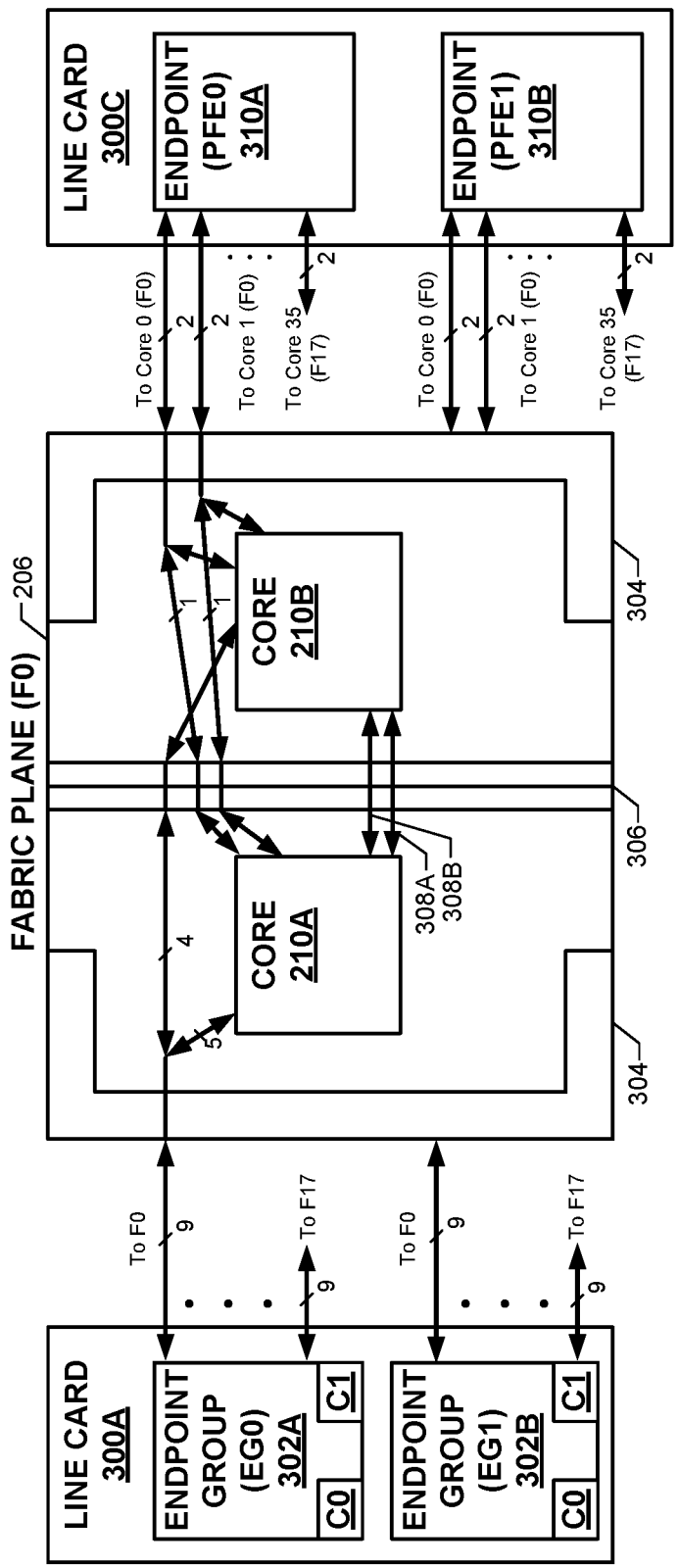

FIGS. 3A and 3B are block diagrams of line cards having fabric endpoints groups with shared and/or unbalanced link connections to a fabric plane. In the illustrated example of FIG. 3A, the line cards 300A and 300B have each two fabric endpoint groups (e.g., endpoint groups 302A and 302B and endpoint groups 302C and 302D respectively). The endpoint groups 302A-302D each includes multiple fabric endpoints. Each of the fabric endpoints may represent a PFE or other packet processor, for instance. In the illustrated example, the endpoint groups 302A-302D each includes two fabric endpoints (e.g., endpoints "C0" and "C1"). The fabric endpoints C0 and C1 of the illustrated examples may be examples of the fabric endpoints 207 of FIG. 2 above. In the illustrated example, endpoint groups 302A and 302B (for simplicity, sometimes referred to as "EG0 302A" and "EG1 302B, respectively) are each connected to the fabric plane 206 using nine links. Similarly, endpoint groups 302C and 302D (for simplicity, sometimes referred to as "EG2 302C" and "EG3 302D, respectively) are each connected to the fabric plane 206 using nine links.

EG0 302A is connected to the first fabric core 210A using 5 links. EG0 302A is connected to the second fabric core 210B using 4 links via bypass links 306 within the fabric plane 206. The endpoints C0 and C1 of EG0 302A each have 2 dedicated links of the 5 links to the first core 210A and endpoints C0 and C1 of EG0 302A share 1 of the 5 links to the first core 210A (sometimes referred to as a "shared link" or a "0.5 link"). Endpoint C0 of EG0 302A is connected to the second core 210B with 2 dedicated links of the 4 links to the second core 210B. Overall, C0 of EG0 302A is connected to the first fabric core 210A using 2.5 links and is connected to the second fabric core 210B using 2 links. Similarly, C1 of EG0 302A is connected to the first fabric core 210A with 2 dedicated links and 1 shared link and connected to the second fabric core 210B with 2 dedicated links. EG1 302B and endpoints C0 and C1 thereof are connected to fabric cores 210A, 210B similarly to EG1 302A.

EG2 302C and EG3 302D are connected to the first fabric core 210A and the second fabric core 210B in a manner that is reciprocal to EG0 and EG1 with respect to fabric cores 210A, 210B. For example, C0 and C1 of EG2 302C each have 2 dedicated links and share a link to the second fabric core 210B while each having 2 dedicated links to the first fabric core 210A. Thus, C0 of EG2 302C is connected to the second fabric core 210A using 2.5 links and is connected to the first fabric core 210A using 2 links. In the illustrated example, the links from the endpoints to the fabric plane 206 are connected to ports 304 on the fabric plane 206 and are connected to the respective fabric cores 210 via internal connections.

The follow example describes example cell traffic between C0 of EG0 302A to C0 of EG2 302C. Traffic originating on an unshared link of C0 of EG0 302A is switched to an unshared link of C0 of EG2C via the same fabric core 210A (e.g., without going through an inter-core link). Traffic originating on the shared link connected to the first fabric core 210A (e.g., the link shared between C0 and C1 of EG0 302A) is sent to the shared link connected to the second fabric core 210B (e.g., the link shared between C0 and C1 of EG2 302C). To do this, the first fabric core 210A and the second fabric core 210B are connected via an inter-core link 308. A cell sent on the shared link associated with C0 of EG0 302A to the first fabric core 210A is switched to the inter-core link 308 to be sent to the second fabric core 210B. At the second fabric core 210B, cells originating on the inter-core link 308 are switched to the shared linked associated with C0 of EG2 302C. The routing table of the first fabric core uses the input port of the cell and the destination endpoint specified in the cell header to achieve switching. Because the inter-core links 308 are associated with two endpoints (e.g., a cell arriving on the inter-core link 308 may ultimately be destined for C0 or C1 of EG2 302C because of the link shared between them), the inter-core links 308 have two logical sub-channels, each acting as a destination endpoint.

In the illustrated example of FIG. 3B, EG0 302A and EG1 302B are connected to the fabric cores 206 as described in FIG. 3A. Fabric endpoints 310A and 310B (referred to as "PFE0 310A" and PFE1 310B" respectively) are connected to each of the fabric cores 206 using single link. The fabric endpoints 310A and 310B in the illustrated example of FIG. 3B may be examples of the fabric endpoints 207 of FIG. 2 above. Thus, the links to the fabric cores are unbalanced. Traffic from PFE0 310A to line card EG0 302A implies 2 links of source traffic to 4.5 links of destination traffic. From the point of view of the fabric plane 206, this traffic should be sprayed in a ratio of 4:4:1 (e.g., four cells to each of the unshared links for every cell to the shared links). Depending on whether the shared link is connected to the same fabric core 210 as the incoming from link card 300C, each fabric core 210 will send the "1" ratio traffic to the shared link either directly or using the inter-core link 308A.

Traffic originating at one of the group endpoints (e.g., EG0 302A) destined for one of the endpoints (e.g., PFE0 310A) on the shared link is split evenly. One half of the cell traffic is switched to the link to PFE0 310A from the fabric core (e.g., the first fabric core 210A) at which the cell was received and half of the cell traffic is switched to an inter-core link 308B to the other fabric core (e.g., the second fabric core 210B). The inter-core link 308B used for traffic from a group endpoint to an endpoint (e.g., group endpoint-to-endpoint traffic) may use separate inter-core links 308B apart from inter-core links 308A used for traffic between group endpoints and endpoint-to-group endpoint traffic. Each endpoint (e.g., PFE 310A and PFE 310B) may be associated with a different inter-core link 308B. In such a manner, the fabric core can identify the source group endpoint based on which one of the inter-core link 308B that the cell arrived on (e.g., in system that use a single field for the destination and source while a cell is being switched through the fabric plane).

Figure 4A:
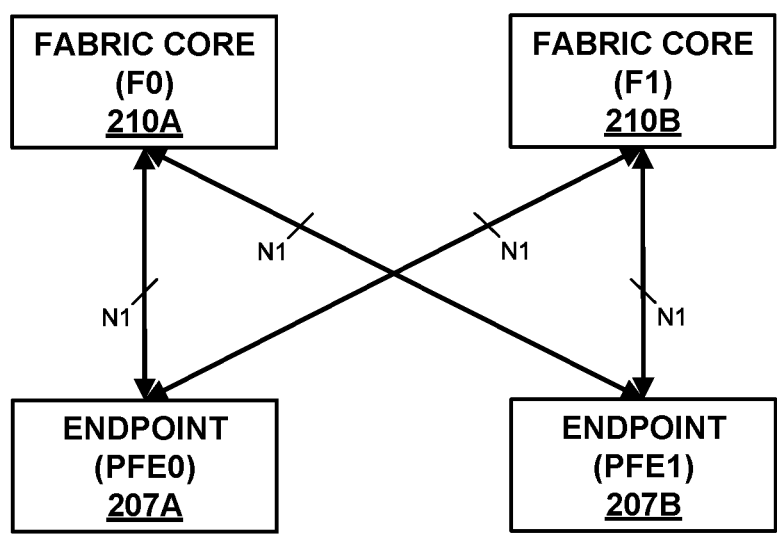
FIGS. 4A, 4B, and 4C are block diagrams of example configurations of endpoints connected to fabric cores.
Figure 4B:
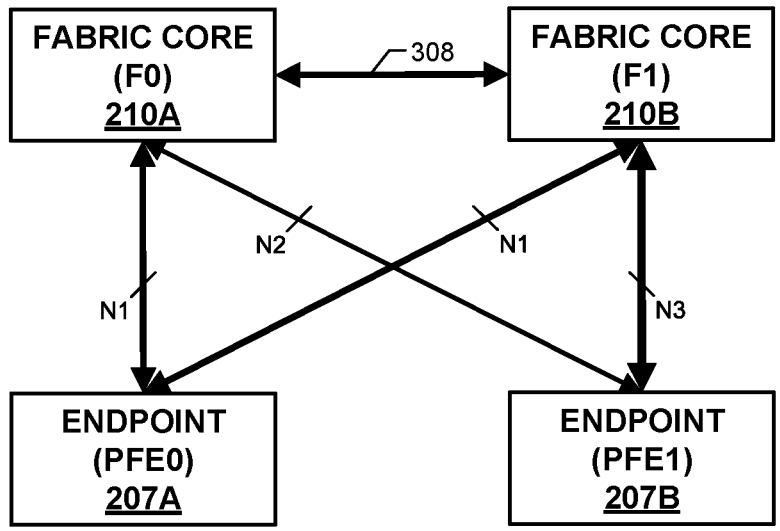
Figure 4C:
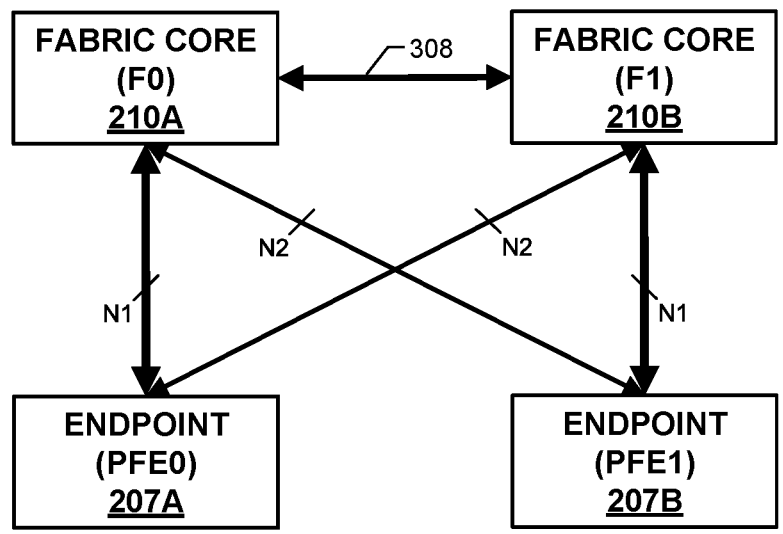

FIGS. 4A, 4B, and 4C are block diagrams of example configurations of endpoints 207 connected to fabric cores 210A and 210B of a fabric plane. In FIG. 4A, the endpoints 207 have balanced connections to the fabric cores 210. In the illustrated example, each of the endpoints 207 are connected to each of the fabric cores 210 by an equal number of links (N1 links). FIG. 4B is an example of an unbalanced configuration. In the illustrated example, the endpoints 207 do not have an equal number of links to each of the fabric cores 210. The first endpoint 207A has a first number of links (N1 links) to each of the fabric cores 210. However, the second endpoint 207B has a different number of links to each of the fabric cores 210. In the illustrated example, the second endpoint 207B has a second number of links (N2 links) to the first fabric core 210A and a third number of links (N3 links) to the second fabric core 210B. Because the number of links from the endpoints 207 are unbalanced, an inter-core link 308 is established to facilitate balancing traffic. The links may be configured to be unbalanced in this way when, for example, there are multiple types of endpoints being used within one router and connected to a fabric plane. FIG. 4C is another example of an unbalanced configuration in which each endpoint 207 does not have the same number of links to each of the fabric cores 210. In the illustrated example, the first endpoint 207A has a first number of links (N1 links) to the first fabric core 210A and a second number of links (N2 links) to the second fabric core 210B. The second endpoint 207B has the second number of links (N2 links) to the first fabric core 210A and the first number of links (N1 links) to the second fabric core 210B. The extra links to the fabric core 210 may be referred to as "unbalanced links." This configuration may occur, for example, when the endpoints 207 have an odd number of links to connect to the fabric cores 210, but the endpoints 207 have a same number of link interfaces. As another example, this configuration may occur then when endpoint 207 have a shared link such that N1 is 2 and N2 is 2.5. In the illustrated example of FIG. 4C, the fabric cores 210 have inter-core links 308 to facilitate balancing cell traffic.

Figure 5:
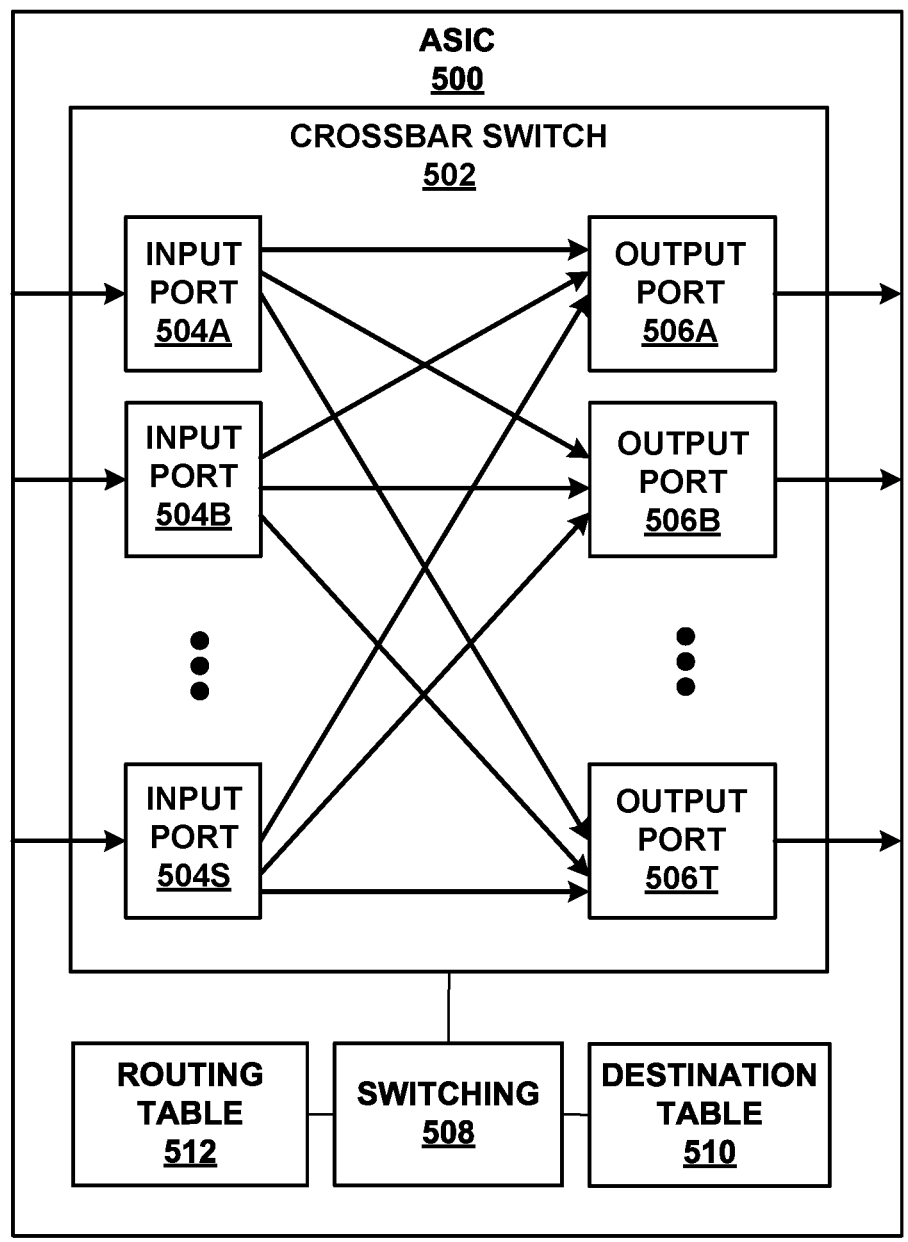
FIG. 5 is a block diagram depicting an application-specific integrated circuit (ASIC) configured to switch cells in accordance with techniques described in this disclosure.

FIG. 5 is a block diagram depicting an application-specific integrated circuit (ASIC) 500 configured to implement a stage switch in accordance with techniques described in this disclosure. The ASIC 500 represents hardware-based logic and may include a programmable integrated circuit. The ASIC 500 may represent an example of a fabric chip and implements crossbar switch 502 for a switching fabric. ASIC 500 may represent any of fabric cores 210, for instance.

The crossbar switch 502 has input ports 504A-504S (collectively, "input ports 504") each capable of spraying cells via a full mesh to each of output ports 506A-506T (collectively, "output ports 506"). A portion of the input ports 504 and/or the output ports 506 are connected to inter-core links to facilitate sending cells to another crossbar switch 502 and receiving cells from another crossbar switch 502. A switching module 508 is programmed with (i) a destination table 510 that identifies output ports 506 usable for reaching destination fabric endpoints 207 and (ii) a routing table 512 that specifies how to route a cell based on the input port and a destination endpoint in the cell header of the cell.

Figure 6:
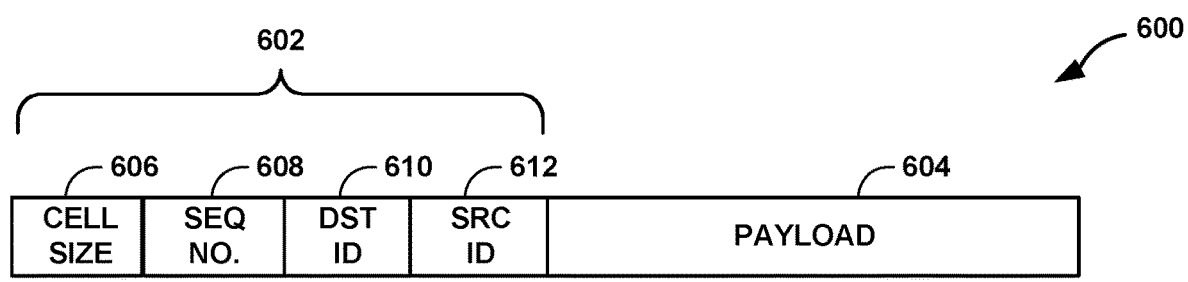
FIG. 6 is a block diagram illustrating an example data cell format according to techniques of this disclosure.

FIG. 6 is a block diagram illustrating an example data cell format according to techniques of this disclosure. Different cell types according to a data cell 600 define operations for fabric endpoints 207 and different stage switches in a multistage switch fabric, as described in further detail below. The data cell 600 includes a cell header 602 and a cell payload 604. The cell header 602 includes the following fields: a cell size 606, a sequence number (SEQ NO.) 608, a destination identifier (DST ID) 610, and a source identifier 612 (SRC ID). Various example implementations for the cell header 602 may rearrange fields, include more or fewer fields, and so forth.

The cell size 606 specifies the size of the cell payload 7604 or, in some cases, the size of the data cell 600 including both the cell header 602 and the cell payload 604. Example cell sizes range from 96 to 200 bytes. The sequence number 608 identifies a sequence number for the cell. The cell destination identifier 610 and cell source identifier 612 identify the destination fabric endpoint and source fabric endpoint for the cell, respectively. The cell destination identifier 610 is used, for example, as an input to the routing table 512, to facilitate the fabric core 210 routing the cell to one of the output ports (e.g., the output ports 506 of FIG. 5 above). The data payload 604 for the data cell 600 is typically packet data for packets switched by the switching system, whether a packet switch or data center fabric for instance.

Figure 7:
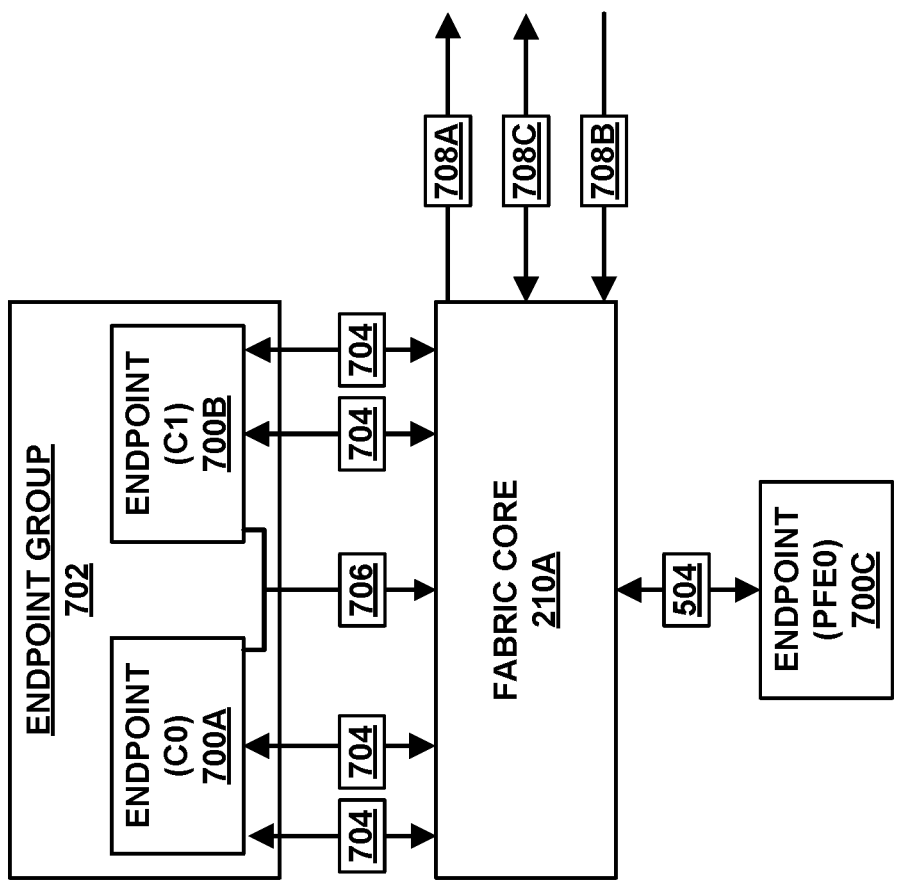
FIG. 7 is a block diagram of an example configuration of different types of endpoints connected to the same fabric cores.

FIG. 7 is a block diagram of an example configuration of different types of endpoints 700A, 700B and 700C connected to the same fabric core 210A. In the illustrated example, endpoints 700A and 700B are in the same endpoint group 702. Endpoint group 702 may be any example of one of the endpoint groups 302 of FIG. 3A and 3B and endpoints 700A and 700B may be examples of endpoints C0 and C1 of FIGS. 3A and 3B. Endpoint 700C may be an example of one of the endpoints (e.g., endpoint 310A) of FIG. 3B. In the illustrated example, the endpoints 700A and 700B collectively have an odd number of links available to connect to the fabric cores 210. The endpoints 700A and 700B each have two links 704 (e.g., unshared links) to the fabric core 210A. Additionally, the endpoint 700A and 700B share a link 706 to the fabric core 210A. An inter-core link 708A is established to switch cell traffic associated with the shared link 706 to the other fabric core (e.g., fabric core 210B of FIG. 2). Additionally, another inter-core link 708B is established to receive cell traffic associated with shared links connected to the other fabric core. The endpoint 700C has a link 704 to the fabric core 210. Inter-core links 708C associated with the endpoint 700C are established between the fabric cores 210.

These inter-core links 708A-708C facilitate balancing cell traffic among the fabric cores 210. The fabric cores 210 include a routing table that specifies how to route a cell and a destination table that maps output ports to endpoints. The routing table that specifies how to route a cell based on the input port and a destination endpoint of the cell. The input ports are associated with a type of link connected to the input port (e.g., an inter-core link, a shared link, an unbalanced link, a unshared link, etc.). For example, a cell may be routed differently if it originates on an shared link 706. The fabric core 210, using the routing table and the destination tables, selects an output port for a cell that is either an output port with a link to one of the endpoints 700A, 700B and 700C or an output port connected to one of the inter-core links 708A-708C. In some examples, on the routing table, each destination endpoint is mapped to a deficit weighted round robin (DWRR) configuration, a spray ratio, and one or more output ports. The DWRR configuration has two bits: a bypass bit and a spray select bit. When the bypass bit is set, the fabric core routes the cell from the input port to the output port (e.g., every cell that arrives at the input port is switched to the specified output port). When the bypass bit is not set, then the fabric core 210 switches cells arriving at the input port to multiple output ports using DWRR and the specified spray ratio. The spray select bit specifies the parameters of the DWRR using the spray ratio. Example routing tables are illustrated on Tables 1 and 2 below.

TABLE 1

| Destination | Input Port | Bypass | Output Port | Output Port | Spray Ratio |
| --- | --- | --- | --- | --- | --- |
| PFE0 | PFE0 Direct Link | 1 | PFE0 Direct Link | — | — |
|  | C0 or C1 Direct Link | 1 | PFE0 Direct Link | — | — |
|  | PFE0 Inter-Core link | 1 | PFE0 Direct Link | — | — |
|  | C0 or c1 Shared Link | 0 | PFE0 Direct Link | PFE0 Inter-Core Link | 1:1 |

TABLE 2

| Destination | Input Port | Bypass | Output Port | Output Port | Output Port | Spray Ratio |
|---|---|---|---|---|---|---|
| C0 | PFE0 Direct Link | 0 | C0 Direct Link | C0 Direct Link | C0 Shared Link | 4:4:1 |
| | C0 or C1 Direct Link | 0 | C0 Direct Link | C0 Direct Link | — | 1:1 |
| | C0 or C1 Shared Link | 1 | Inter-core Link | — | — | — |
| | Inter-core Link | 1 | C0 Shared Link | — | — | — |

In the examples illustrated on Table 1, cells that have a destination of the endpoint 700C and are received from the input port is connected to the unbalance link of either the first or second endpoints 700A and 700B, the cell is sprayed with a 1:1 ratio to either the output port connected to the endpoint 700C or the output port connected to the inter-core link associated with the endpoint 700C using DWRR. As an example, illustrated on Table 2, cells that have the destination of one of the endpoints 700A and 700B that arrive from an input port connected to an inter-core link are switched to an output port connected to its unbalanced link.

Figure 8:
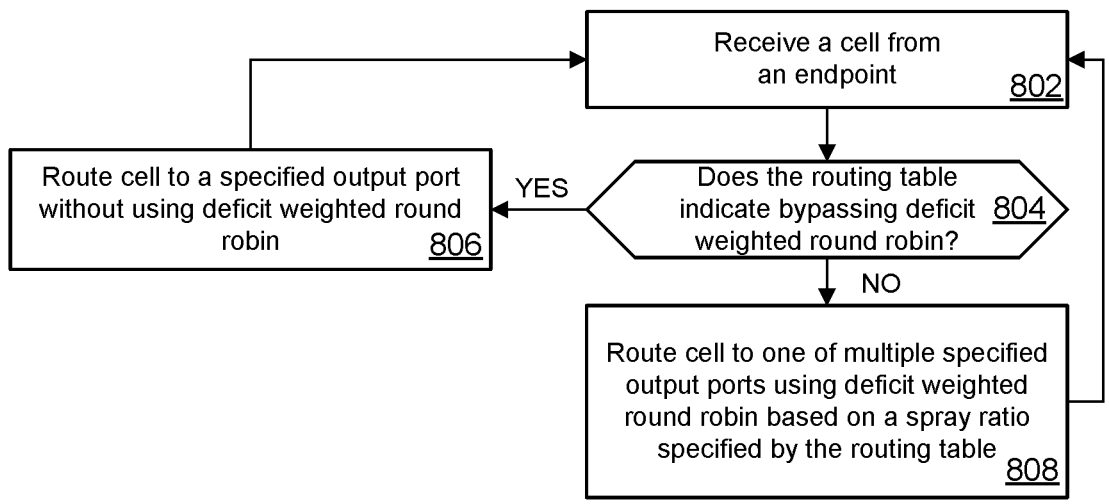
FIG. 8 is a flowchart illustrating an example method of switching cells by the fabric cores.

FIG. 8 is a flowchart illustrating an example method of switching cells by the fabric cores 210. The fabric core 210 receives a cell from an input port (e.g., one of the input ports 504 of FIG. 5 above) (802). The cell includes a cell header (e.g., the cell header 602 of FIG. 6 above) with a destination identifier (e.g., the destination identifier 610 of FIG. 6 above) to signify which endpoint the cell is to be routed to. The input port may be, for example, associated with a direct link, a shared link, or a balanced link from an endpoint or an inter-core link from another fabric core 210. Based on the input port from which the cell was received and destination endpoint, the fabric core 210 determines, using the routing table, whether to bypass deficit weighted round robin to determine which output port to switch the cell to (804). For example, for some input ports, the routing table may specify that deficit weight round robin is not needed to route the cell to the appropriate output port. Some input ports may be associated with a single output port. When the fabric core 210 is to bypass deficit weighted round robin (YES at 804), the fabric core 210 switches the cell to the output port specified by the routing table without using deficit weighted round robin (806). In some examples, the output port is connected to a shared link or an inter-core link. When the fabric core 210 is not to bypass deficit weighted round robin (NO at 804), the fabric core 210 is to switch the cell to one of the specified output ports using deficit weighted round robin and a spray ratio specified by the routing table (block 808). In some examples, one of the specified ports is connected to an inter-core link.

Figure 9:
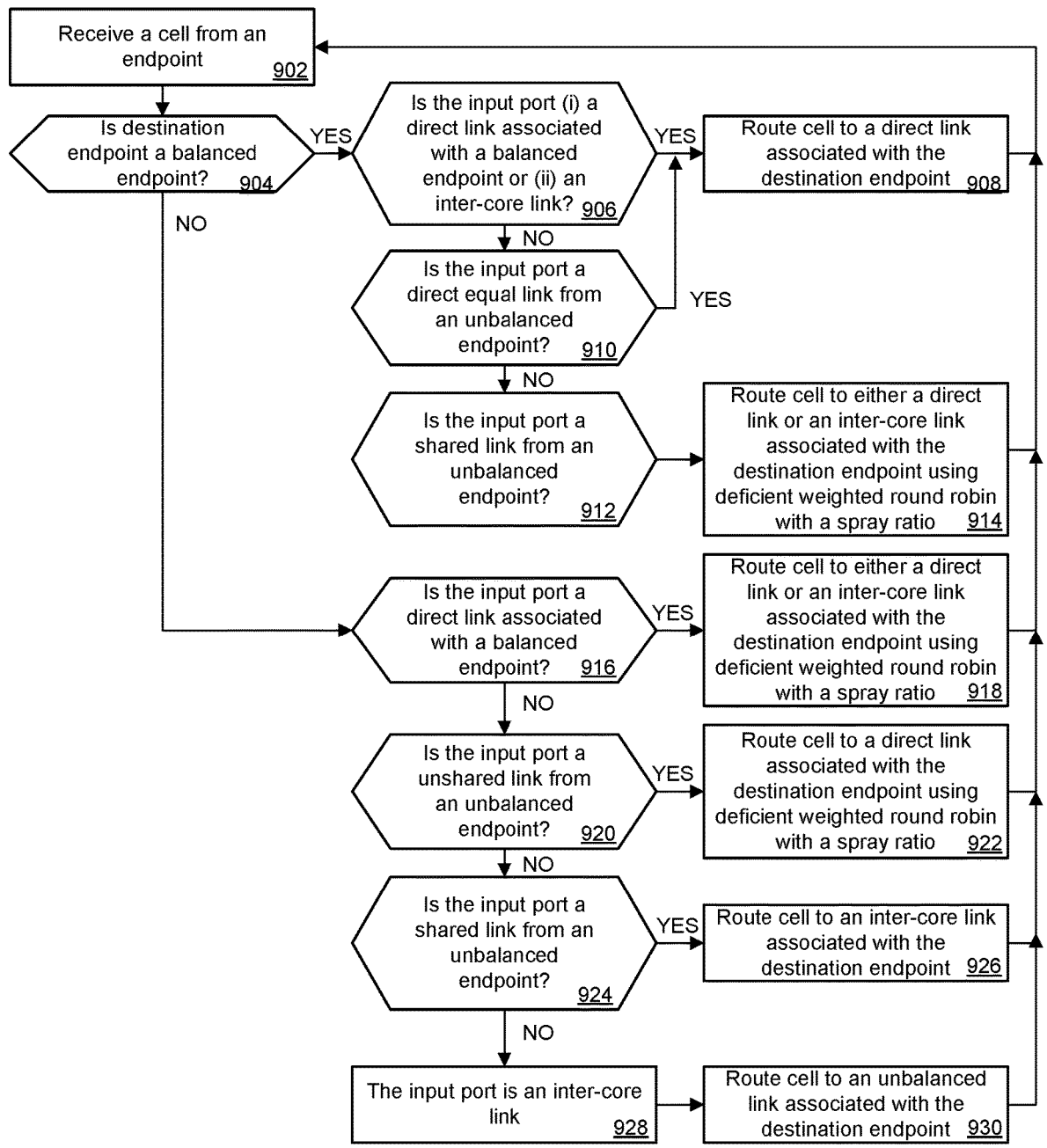
FIG. 9 is a flowchart illustrating an example method of switching cells by the fabric core based on an input port and a destination endpoint.

FIG. 9 is a flowchart illustrating one approach of switching cells by a fabric core having an example configuration (e.g., the configuration as illustrated in FIG. 7 above) and based on a routing table that uses the input port and the destination endpoint to switch the cells. Initially, the fabric core 210 receives a cell from an input port (e.g., one of the input ports 504 of FIG. 5 above) (902). The cell includes a cell header (e.g., the cell header 602 of FIG. 6 above) with a destination identifier to signify which endpoint the cell is to be routed to. The input port may be, for example, associated with a direct link, a shared link, or a balanced link from an endpoint or an inter-core link from another fabric core 210. In the illustrated example, the routing table routes the cell based on whether the destination input is a balanced endpoint (e.g., an endpoint that has the same number of links to the fabric cores 210 on a fabric plane 206) or an unbalanced endpoint (e.g., an endpoint that has different number of links to the fabric cores 210 of a fabric plane 206). An example router may have a combination of balanced and unbalanced endpoints or may have endpoints with shared links. The fabric core 210, using the routing table, determines whether the destination endpoint is a balanced endpoint (904). When the destination endpoint is a balanced endpoint, the fabric core 210, the method continues at block 906. When the destination endpoint is not a balanced endpoint, the fabric core 210, the method continues at block 916.

At block 906, the fabric core 210 determines whether the input port is (i) a direct link associated with a balanced endpoint or (ii) an inter-core link. When the input port is (i) a direct link associated with a balanced endpoint or (ii) an inter-core link (YES at 906), the fabric core 210 routes the cell to a direct link associated with the destination endpoint (08). Otherwise, when the input port is a direct equal link from an unbalanced endpoint (YES at 910), the fabric core 210 routes the cell to a direct link associated with the destination endpoint (908). Otherwise, when the input port is a unequal link from an unbalanced endpoint (YES at 912), the fabric core 210 routes the cell to either a direct link or an inter-core link associated with the destination endpoint using deficient weighted round robin with a spray ratio specified by the routing table (block 914).

At block 916, the fabric core 210 determines whether the input port is a direct link associated with a balanced endpoint. When the input port is a direct link associated with a balanced endpoint (YES at 916), the fabric core 210 routes the call to either a direct link or an inter-core link associated with the destination endpoint using deficient weighted round robin with a spray ratio specified by the routing table (918). Otherwise, the fabric core 210 determines whether the input port is a direct equal link from an unbalanced endpoint (920). When the input port is a direct unshared link from an unbalanced endpoint (YES at 920), the fabric core 210 routes the cell to a direct link associated with the destination endpoint using deficient weighted round robin with a spray ratio (922). Otherwise, the fabric core 210 determines whether the input port is a shared link from an unbalanced endpoint (924). When the input port is a shared link from an unbalanced endpoint (YES at 924), the fabric core 210 routes the cell to an inter-core link associated with the destination endpoint (926). Otherwise, the fabric core 210 determines the input port is an inter-core link (block 928). The fabric core 210 then routes the cell to the shared link associated with the destination endpoint (930).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A routing system comprising:
   a plurality of fabric endpoints; and
   a switching fabric comprising a fabric plane to switch cells among the plurality of fabric endpoints,
   wherein the fabric plane includes two fabric cores and one or more inter-core links connecting the fabric cores,
   wherein each fabric core is configured to select an output port of the fabric core to which to route a received cell of the cells based on (i) an input port of the fabric core on which the received cell was received and (ii) a destination fabric endpoint for the received cell, at least a portion of the selected output ports being connected to the inter-core links, and switch the received cell to the selected output port,
   wherein each fabric core includes a routing table that maps an input port to one or more output ports to route the received cell based on (i) an input port of the fabric core on which the received cell was received and (ii) a destination fabric endpoint for the cell,
   wherein at least a portion of the input ports are mapped to at least two output ports, and
   wherein for the portion of the input ports that are mapped to at least two of the output ports, the routing table specifies a spray ratio to use to select one of the at least two output ports.

2. The routing system of claim 1, wherein for the portion of the input ports that are mapped to at least two of the output ports, one of the at least two output ports is mapped to one of outputs associated with one of the inter-core links.

3. The routing system of claim 1, wherein a first portion of the plurality of fabric endpoints has a first number of links to each of the fabric cores and a second portion of the plurality of fabric endpoints has a second number of links to each of the fabric cores.

4. A routing system comprising:
   a plurality of fabric endpoints; and
   a switching fabric comprising a fabric plane to switch cells among the pluraliy of fabric endpoints,
   wherein the fabric plane includes two fabric cores and one or more inter-core links connecting the fabric cores,
   wherein each fabric core is configured to select an output port of the fabric core to which to route a received cell of the cells based on (i) an input port of the fabric core on which the received cell was received and (ii) a destination fabric endpoint for the received cell, at least a portion of the selected output ports being connected to the inter-core links, and switch the received cell to the selected output port,
   wherein two fabric endpoints of the plurality of fabric endpoints collectively have an odd number of connections to the fabric plane,
   wherein the two fabric endpoints share a link to each of the two fabric cores, and
   wherein one of the inter-core links is associated in a routing table to the shared link.

5. The routing system of claim 1, wherein when the input port is associated with one of the inter-core links, the cell is routed to one of the output ports associated with the destination fabric endpoint.

6. A method of routing cells in a router with a plurality of fabric endpoints and a switching fabric comprising a fabric plane to switch cells among the plurality of fabric endpoints, wherein the switch fabric plane includes two fabric cores and one or more inter-core links connecting the fabric cores, the method comprising:
   receiving cells at a plurality of input ports;
   selecting, by a fabric core of the fabric cores, an output port of the fabric core to route a received cell of the cells based on (i) an input port of the fabric core on which the received cell was received and (ii) a destination fabric endpoint for the received cell, at least a portion of the selected output ports being connected to the inter-core links; and
   switching, by the fabric core, the received cell to the selected output port,
   wherein each fabric core includes a routing table that maps an input port to one or more output ports to route the received cell based on (i) an input port of the fabric core on which the received cell was received and (ii) a destination fabric endpoint for the cell, wherein selecting the output port of the fabric core includes selecting the one of the one or more output ports based on the routing table,
   wherein at least a portion of the input ports are mapped to at least two output ports, and wherein for the portion of the input ports that are mapped to at least two of the output ports, the routing table specifies a spray ratio to use to select one of the at least two output ports.

7. The method of claim 6, wherein for the portion of the input ports that are mapped to at least two of the output ports, one of the at least two output ports is mapped to one of output associated with one of the inter-core links, wherein selecting the one of the output ports includes selecting, for a portion of the cells, the one of the output ports associated with one of the inter-core links based on the spray ratio.

8. The method of claim 6, wherein a first portion of the plurality of fabric endpoints has a first number of links to each of the fabric cores and a second portion of the plurality of fabric endpoints has a second number of links to each of the fabric cores.

9. A method of routing cells in a router with a plurality of fabric endpoints and a switching fabric comprising a fabric plane to switch cells among the plurality of fabric endpoints, wherein the switch fabric plane includes two fabric cores and one or more inter-core links connecting the fabric cores, the method comprising:
receiving cells at a plurality of input ports;
selecting, by a fabric core of the fabric cores, an output port of the fabric core to route a received cell of the cells based on (i) an input port of the fabric core on which the received cell was received and (ii) a destination fabric endpoint for the received cell, at least a portion of the selected output ports being connected to the inter-core links; and
switching, by the fabric core, the received cell to the selected output port,
wherein two fabric endpoints of the plurality of fabric endpoints have collectively an odd number of connections to the fabric plane,
wherein the two fabric endpoints share a link to each of the two fabric cores, and
wherein one of the inter-core links is associated in a routing table to the shared link, wherein selecting the one of the output ports includes selecting one of the output ports associated with the one of the inter-core links for the cells received from one of the input ports associated with the shared link.

10. A network device comprising:
a plurality of line cards collectively having a plurality of fabric endpoints;
a fabric switch card coupled to the line cards and comprising a fabric plane to switch cells among the plurality of fabric endpoints,
wherein the fabric plane includes two fabric cores and one or more inter-core links connecting the fabric cores,
wherein each fabric core is configured to select an output port of the fabric core to route a received cell of the cells based on (i) an input port of the fabric core on which the received cell was received and (ii) a destination fabric endpoint for the received cell, at least a portion of the selected output ports being connected to the inter-core links, and switch the received cell to the selected output port,
wherein each fabric core includes a routing table that maps an input port to one or more output ports to route the received cell based on (i) an input port of the fabric core on which the received cell was received and (ii) a destination fabric endpoint for the cell,
wherein at least a portion of the input ports are mapped to at least two output ports, and wherein for the portion of the input ports that are mapped to at least two of the output ports, the routing table specifies a spray ratio to use to select one of the at least two output ports.

11. A network device comprising:
a plurality of line cards collectively having a plurality of fabric endpoints;
a fabric switch card coupled to the line cards and comprising a fabric plane to switch cells among the plurality of fabric endpoints,
wherein the fabric plane includes two fabric cores and one or more inter-core links connecting the fabric cores,
wherein each fabric core is configured to select an output port of the fabric core to route a received cell of the cells based on (i) an input port of the fabric core on which the received cell was received and (ii) a destination fabric endpoint for the received cell, at least a portion of the selected output ports being connected to the inter-core links, and switch the received cell to the selected output port,
wherein two fabric endpoints of the plurality of fabric endpoints collectively have an odd number of connections to the fabric plane,
wherein the two fabric endpoints share a link to each of the two fabric cores, and
wherein one of the inter-core links is associated in a routing table to the shared link.

12. The routing system of claim 1, wherein two fabric endpoints of the plurality of fabric endpoints collectively have an odd number of connections to the fabric plane.

13. The routing system of claim 12, wherein the two fabric endpoints of the plurality of fabric endpoints share a link to each of the two fabric cores.

14. The routing system of claim 13, wherein one of the inter-core links is associated in a routing table to the shared link.

15. The routing system of claim 4, wherein each fabric core includes a routing table that maps an input port to one or more output ports to route the received cell based on (1) an input port of the fabric core on which the received cell was received and (ii) a destination fabric endpoint for the cell.

16. The routing system of claim 15, wherein at least a portion of the input ports are mapped to at least two output ports.

17. The routing system of claim 16, wherein for the portion of the input ports that are mapped to at least two of the output ports, the routing table specifies a spray ratio to use to select one of the at least two output ports.

18. The routing system of claim 4, wherein a first portion of the plurality of fabric endpoints has a first number of links to each of the fabric cores and a second portion of the plurality of fabric endpoints has a second number of links to each of the fabric cores.

19. The routing system of claim 4, wherein when the input port is associated with one of the inter-core links, the cell is routed to one of the output ports associated with the destination fabric endpoint.

20. The method of claim 6,
wherein two fabric endpoints of the plurality of fabric endpoints have collectively an odd number of connections to the fabric plane, and
wherein the two fabric endpoints share a link to each of the two fabric cores.

* * * * *